United States Patent
Panagiotopoulou et al.

(10) Patent No.: US 11,220,015 B2
(45) Date of Patent: Jan. 11, 2022

(54) METHODS AND APPARATUS FOR DETECTING HAIR CHARACTERISTICS WITH A SHAVING DEVICE

(71) Applicant: Bic Violex S.A., Anixi (GR)

(72) Inventors: Vasiliki Panagiotopoulou, Athens (GR); Athanasia Panou, Athens (GR); Panagiotis Moustakas, Athens (GR); Georgios Pyrris, Athens (GR)

(73) Assignee: Bic Violex S.A., Anoixi (GR)

( * ) Notice: Subject to any disclaimer, the term of this patent is extended or adjusted under 35 U.S.C. 154(b) by 98 days.

(21) Appl. No.: 16/622,425

(22) PCT Filed: Jun. 1, 2018

(86) PCT No.: PCT/EP2018/064427
§ 371 (c)(1),
(2) Date: Dec. 13, 2019

(87) PCT Pub. No.: WO2019/001893
PCT Pub. Date: Jan. 3, 2019

(65) Prior Publication Data
US 2020/0139565 A1     May 7, 2020

Related U.S. Application Data

(60) Provisional application No. 62/526,664, filed on Jun. 29, 2017.

(51) Int. Cl.
*B26B 21/40* (2006.01)
*B26B 21/52* (2006.01)
(Continued)

(52) U.S. Cl.
CPC ........ *B26B 21/4056* (2013.01); *B26B 21/521* (2013.01); *B26B 21/225* (2013.01);
(Continued)

(58) Field of Classification Search
None
See application file for complete search history.

(56) References Cited

U.S. PATENT DOCUMENTS 5,165,170 A * 11/1992 Sagol .................. B26B 21/40
30/32
6,497,043 B1   12/2002 Jacobsen
(Continued)

FOREIGN PATENT DOCUMENTS

| | | |
|---|---|---|
| CN | 102762154 A | 10/2012 |
| GB | 2249515 A | 5/1992 |
| KR | 20170013607 A | 2/2017 |

OTHER PUBLICATIONS

International Search Report and Written Opinion issued in related International Application No. PCT/EP2018/064427, dated Sep. 14, 2018 (10 pages).
(Continued)

*Primary Examiner* — Hwei-Siu C Payer
(74) *Attorney, Agent, or Firm* — Bookoff McAndrews, PLLC

(57) ABSTRACT

A shaving system may include a handle, a skin-contacting surface coupled to the handle, one or more blades coupled to the skin-contacting surface, and one or more sensors configured to record sounds generated during use of the shaving system.

20 Claims, 2 Drawing Sheets

(51) Int. Cl.
*B26B 21/22* (2006.01)
*B29L 31/00* (2006.01)

(52) U.S. Cl.
CPC ....... *B26B 21/4012* (2013.01); *B26B 21/4068* (2013.01); *B26B 21/4081* (2013.01); *B29L 2031/7186* (2013.01)

(56) References Cited

U.S. PATENT DOCUMENTS

| | | | | |
|---|---|---|---|---|
| 7,472,577 | B2* | 1/2009 | Shibuichi | A61B 7/00 73/9 |
| 2015/0183118 | A1* | 7/2015 | Roth | B26B 19/3846 132/200 |
| 2016/0067872 | A1 | 3/2016 | Binder | |
| 2016/0167241 | A1* | 6/2016 | Goldfarb | B26B 21/28 382/108 |
| 2017/0232624 | A1* | 8/2017 | King | G01K 1/14 30/34.05 |
| 2018/0236675 | A1* | 8/2018 | Westerhof | B26B 21/4056 |
| 2019/0306259 | A1* | 10/2019 | Burghardt | B26B 19/388 |
| 2020/0139565 | A1* | 5/2020 | Panagiotopoulou | B26B 21/521 |
| 2020/0171687 | A1* | 6/2020 | Amavasai | B26B 21/4056 |
| 2020/0206963 | A1* | 7/2020 | Aggelopoulou | B26B 21/4056 |
| 2020/0316799 | A1* | 10/2020 | Tsegenidis | B26B 21/4056 |
| 2021/0086379 | A1* | 3/2021 | Brette | B26B 21/4056 |
| 2021/0122071 | A1* | 4/2021 | Pintzos | G16Y 10/45 |
| 2021/0146560 | A1* | 5/2021 | Panagiotopoulou | B26B 21/4056 |
| 2021/0146562 | A1* | 5/2021 | Panagiotopoulou | A61B 5/442 |

OTHER PUBLICATIONS

Office Action issued in Chinese Patent Application No. 201880031250.8, dated Mar. 26, 2021 (13 pages).

Search Report issued in Chinese Patent Application No. 201880031250.8, dated Mar. 18, 2021 (2 pages).

* cited by examiner

METHODS AND APPARATUS FOR DETECTING HAIR CHARACTERISTICS WITH A SHAVING DEVICE

CROSS-REFERENCE TO RELATED APPLICATION(S)

This patent application is a National Stage Application of International Application No. PCT/EP2018/064427, filed on Jun. 1, 2018, now published as WO2019001893, and which claims the benefit under 35 U.S.C. § 119 to U.S. Provisional Patent Application No. 62/526,664, filed on Jun. 29, 2017.

TECHNICAL FIELD

Various aspects of the present disclosure relate generally to embodiments of systems and methods for detecting hair characteristics with a shaving device. More particularly, the present disclosure describes embodiments of systems and methods for obtaining audio sounds during a shaving session and analyzing corresponding audio signals to, e.g., determine one or more hair characteristics, usage of the shaver, and shaving technique based on the analysis. Based on such determinations, embodiments of the present disclosure may provide recommendations for various shaving products configured to provide an optimal shave experience for users having particular hair types, shaving techniques, and/or shaver use.

DESCRIPTION OF RELATED TECHNOLOGY

Shavers generally include a handle and a cartridge attached to one end of the handle. The cartridge includes at least one blade for shaving hair. A user holds the handle and repeatedly moves the blade across an area of the body to be shaved, e.g., the face, until hair is removed from the surface of the body. As the shaver is used more, the blades dull, reducing the effectiveness of the shaver and increasing skin irritation. Despite this lack of effectiveness, users often continue using shavers with dull blades.

Both the foregoing general description and the following detailed description are exemplary and explanatory only and are not restrictive of the features, as claimed. As used herein, the terms "comprises," "comprising," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges means the value, limit, and/or range +/−10%.

SUMMARY OF THE DISCLOSURE

One aspect of the disclosure is directed to a shaving system that may include a handle, a skin-contacting surface coupled to the handle, one or more blades coupled to the skin-contacting surface, and one or more sensors configured to record sounds (e.g., vibrations travelling through the air) generated during use of the shaving system.

The shaving system may include a processor coupled to the one or more sensors, wherein the processor is configured to determine a number of shaving strokes taken with the one or more blades based on the recorded sounds. The processor may be configured to generate an alert or automatically place an order for new shaving components when the determined number of shaving strokes exceeds a threshold. The shaving system may include a processor coupled to the one or more sensors, wherein the processor is configured to analyze a shaving technique of a user based on the recorded sounds. The processor may be configured to generate an alert based on a length of a shaving stroke of the user, a frequency of shaving strokes of the user, or a tempo of shaving strokes of the user. The shaving system may include a processor coupled to the one or more sensors, wherein the processor is configured to determine one or more of beard density and hair type based on the recorded sounds. The processor may be configured to receive input from a user regarding characteristics of hairs of the user, and is configured to calibrate analysis of the recorded sounds based on the input regarding the characteristics of the hairs of the user. The shaving system may include a cartridge coupled to the handle, the cartridge including the skin-contacting surface, the one or more blades, and at least one of the one or more sensors. The processor may be configured to receive input regarding a type or model number assigned to the cartridge and is configured to calibrate analysis of the recorded sounds based on the input regarding a type or model number assigned to the cartridge. The processor may be configured to receive the input regarding a type or model number assigned to the cartridge via an RFID tag or alphanumeric code coupled to the cartridge. The shaving system may include a processor configured to determine whether shaving is complete based on the recorded sounds. The processor may be configured to determine whether shaving is complete by determining whether a number of the recorded sounds in a given time period attributable to cutting hair is less than a threshold number.

In another aspect, the disclosure is directed to a method of analyzing a shaving session. The method may include receiving audio signals from one or more microphones coupled to a shaver, analyzing the audio signals, and providing feedback based on the analysis.

Providing feedback may include determining whether any replacement parts are needed based on the analysis and generating an alert or automatically ordering replacement parts upon determining that replacement parts are needed. Providing feedback may include determining whether a user shaving technique is sub-optimal and providing feedback to the user upon determining that the user shaving technique is sub-optimal. Determining whether a user shaving technique is sub-optimal may include determining whether a length of a shaving stroke of the user, a frequency of shaving strokes of the user, or a tempo of shaving strokes of the user is sub-optimal. The method also may include determining one or more of beard density and hair type based on the audio signals. The method also may include receiving input from a user regarding characteristics of the hairs of the user, and calibrating analysis of the audio signals based on the input regarding the characteristics of the hairs of the user.

In another aspect, the disclosure is directed to a controller for a shaving system, the controller being coupled to one or more microphones attached to a shaver of the shaving system. The controller may include a processor configured to receive audio signals from the one or more microphones, analyze the audio signals, and provide feedback based on the analysis.

Providing feedback may include determining whether a user shaving technique is sub-optimal and providing feedback to the user upon determining that the user shaving technique is sub-optimal.

BRIEF DESCRIPTION OF THE DRAWINGS

The accompanying drawings, which are incorporated in and constitute a part of this specification, illustrate various exemplary embodiments and together with the description, serve to explain the principles of the disclosure.

Aspects of the disclosure may be implemented in connection with embodiments illustrated in the attached drawings. These drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure. There are many aspects and embodiments described herein. Those of ordinary skill in the art will readily recognize that the features of a particular aspect or embodiment may be used in conjunction with the features of any or all of the other aspects or embodiments described in this disclosure.

DETAILED DESCRIPTION

Reference now will be made in detail to examples of the present disclosure described above and illustrated in the accompanying drawings. Wherever possible, the same reference numbers will be used throughout the drawings to refer to the same or like parts.

Figure 1:
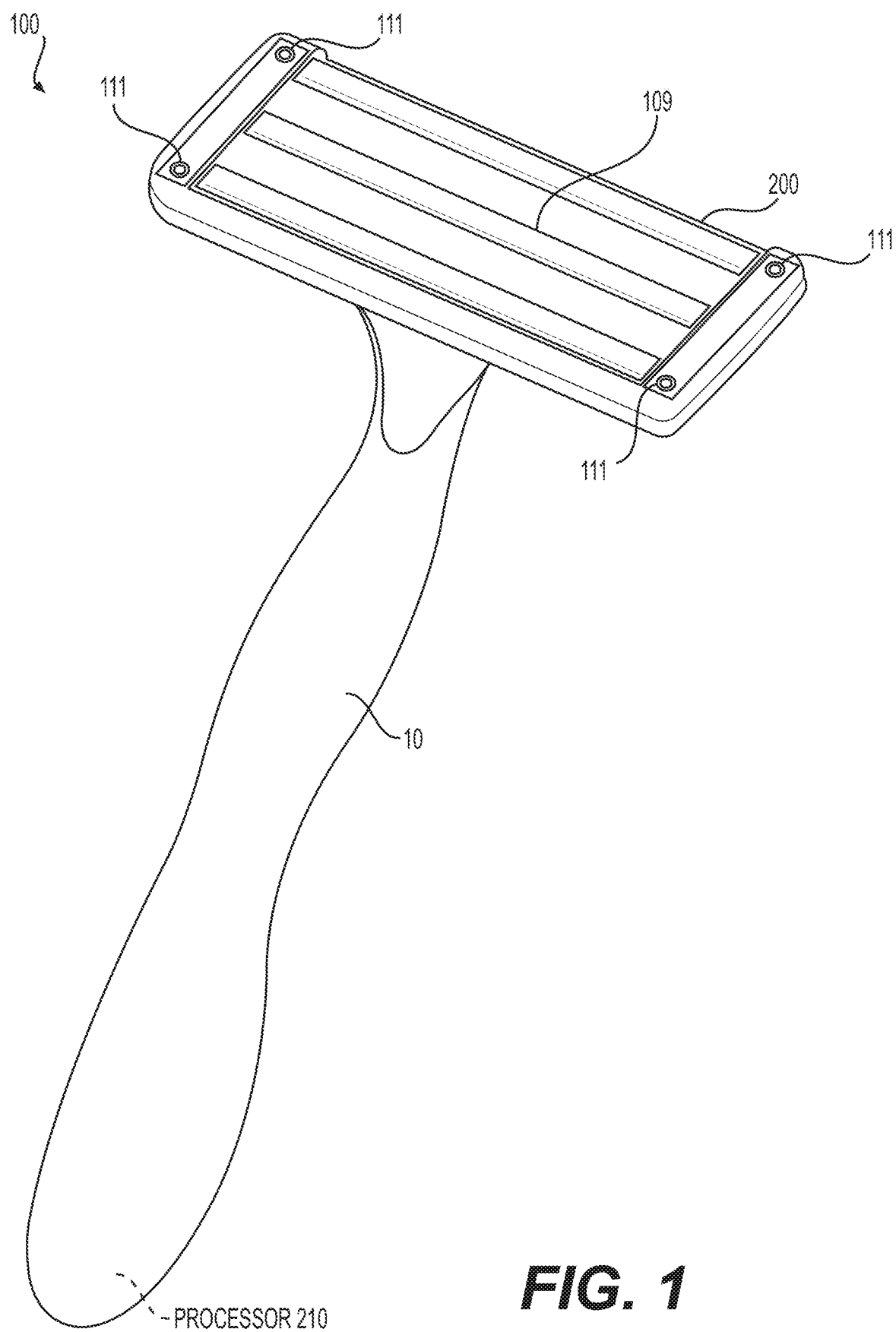
FIG. 1 shows an exemplary shaver according to the disclosure.

FIG. 1 shows an example of a shaver 100. Shaver 100 includes a handle 10 and a cartridge 200 having one or more blades 109. Shaver 100 also may include at least one sensor 111. Each sensor 111 may be a microphone configured to convert sound into an electrical signal. Any suitable microphone may be used, including, e.g., dynamic microphones, condenser microphones, piezoelectric microphones, or any other suitable microphone or audio pickup device.

Sensors 111 may be integrated into any part of shaver 100. For example, sensors 111 may be in cartridge 200 or on a surface of cartridge 200. In the embodiment shown in FIGS. 1 and 2, there are four sensors 111. However, any suitable number of sensors 111 may be utilized. For example, additional sensors 111 may be positioned around the periphery of cartridge 200 to, e.g., give a more robust understanding of the user shaving habits and/or hair characteristics. In one embodiment, cartridge 200 may include a grid of sensors 111 (e.g., a 4×4 grid, 8×8 grid, or the like). Sensors 111 may be disposed on a skin-contacting surface or a non-skin-contacting surface of cartridge 200. Sensors 111 also may be coupled to handle 10. Alternatively, sensors 111 could be microphones attached to a base station (not shown) associated with the shaver 100 (e.g., a base station where shaver 100 is docked), or a mobile device (e.g., mobile phone computer, tablet) of the user. In such embodiments, the user may be instructed to open a mobile application on the mobile device or press a button on the base station to initiate a "recording mode," and may be instructed to conduct shaving in relative close proximity to the base station or mobile device (e.g., within five feet).

As discussed above, shaver 100 may include or may be otherwise coupled to one or more processors 210. In one embodiment, the processor 210 may be disposed remotely from shaver 100. In such instances, shaver 100 may include electronics to transmit and receive data to and from processor 210. In other embodiments, processor 210 may be disposed within shaver 100, e.g., within handle 10 and/or cartridge 200. Data captured by sensors 111 may be stored in a memory and analyzed by processor 210. In some embodiments, data from sensors 111 on shaver 100 may be transmitted to a separate base and/or to a smartphone or computer by wired or wireless mechanisms. In exemplary embodiments, data from sensors 111 may be transmitted to a base, a computer, or a smartphone having a processor 210 equipped with software configured to analyze the received data to provide information to the user pertaining to the user shaving technique, a number of shaving strokes taken by the user (or a distance shaver 100 has travelled), characteristics of the hair of the user, and/or whether the user would benefit from one or more specialized items to optimize shaving performance and comfort.

Processor 210 may filter the audio signal from sensor(s) 111. The filtering may include filtering certain unwanted noise from the audio signal. For example, processor 210 may filter noise that is outside a normal audio range of sounds generated by shaving, or that would otherwise distort the analysis performed by processor 210. Processor 210 may be configured to filter out ambient noise such as, e.g., conversations and the like. In addition to digital filtering, analog high pass filters and/or analog low pass filters may be utilized.

Processor 210 may be configured to analyze filtered and/or unfiltered audio signals from sensor 111 to determine one or more hair characteristics (e.g., a hair type, thickness, etc.) of the user. For example, processor 210 may determine beard hardness and beard density based on the sounds recorded by sensors 111 during shaving. More particularly, a relatively more dense beard may produce more "noise" or sound as compared to a relatively less dense beard.

The analysis performed by processor 210 may be dependent on the type of shaver 100, cartridge 200, and/or blades 109 that are used during shaving. That is, different shaving equipment may produce different sounds, and thus, processor 210 may receive input from the user regarding the equipment used by the user prior to analyzing audio signals from sensor 111. For example, when shaver 100 can be used with multiple types of cartridges 200, the user may input the type of, or model number assigned to cartridge 200 being used into a mobile application associated with shaver 100. For example, the user may scan a QR code to input details of the particular cartridge into the mobile application. Alternatively, each sensor 111 may include a unique identifier that identifies the type of blade, cartridge, and/or shaver that it is associated with. This unique identifier (e.g., an RFID tag, an alphanumeric code, etc.) could be identifiable by a mobile device (e.g., mobile phone) of the user, or could be manually entered by the user into a mobile application.

The analysis performed by processor 210 also may be dependent on whether a shaving agent is used during shaving, and if so, the type of shaving agent used. The user may input whether a shaving agent is used, and if so, the type of shaving agent used, so that processor 210 may account for such data during its analysis. Processor 210 may be configured to determine if additional shaving agent is needed during shaving, and whether one or more of blades 109 have become dull. For example, processor 210 may determine that an amplitude of sound picked up by sensor 111 may be higher than usual based on a lack of sufficient shaving agent, and/or because blades 109 are dull. In one embodiment, processor 210 may determine, based on an analysis of audio signals from sensor 111, that shaving has been completed. For example, processor 210 may be configured to recognize audio signals consistent with and representative of hair being cut by blades 109. When shaving is complete, there may be a lack of such cutting sounds, and processor 210 may determine that if no such cutting sounds are detected for a threshold period of time, that shaving may be complete. Alternatively, processor 210 may determine that a frequency of cutting sounds is below a threshold frequency and that shaving is complete, or near-complete (e.g., complete within an acceptable margin).

Processor 210 may be configured to administer a survey, via a mobile application, to the user to help enhance the accuracy of the audio analysis performed. For example, the user may answer questions pertaining to the user perceptions of his or her own hair and shaving characteristics. For example, the user may indicate that he has a relatively high-density beard, a relatively low-density beard, and/or a relatively average-density beard into the mobile application. The user may indicate that he has relatively thick hair, relatively thin hair, or hair with average thickness. Processor 210 may provide the user with images and/or explanations for one or more categories of questions to assist the user in arriving at an accurate answer. Pictures with different beard densities and/or different hair types may be shown to the user via the mobile application, and the user may select one or more of the pictures that resembles or substantially resembles the hair of the user. Additionally, the user may input other personal information including, e.g., age, gender, nationality, and the like. Processor 210 then may utilize the user answers to calibrate the analysis performed on the audio signals. For example, processor 210 may be configured to run different filters on the received audio signals based on the user answers.

Processor 210 also may be configured to identify shaving strokes and their lengths, and track both the number of shaving strokes taken with shaver 100 and a total distance travelled of shaver 100. For example, processor 210 may analyze the audio signals from sensors 111 to determine the number and length of the strokes taken with shaver 100. For example, the start and end of a shaving stroke may be determined by a segment of the audio signal indicating uninterrupted cutting sounds.

As set forth above, processor 210 may determine a usage of shaver 100 based on the input received from sensors 111 over time. For example, processor 210 may track an overall distance travelled by shaver 100, an amount of time that shaver 100 has been used to cut hair, and/or a number of shaving strokes that shaver 100 has been used for. For example, when processor 210 determines that shaver 100 has exceeded a usage threshold based on any of the aforementioned criteria, processor 210 may generate an alert and/or automatically order replacement parts such as, e.g., a replacement cartridge 200 or a replacement shaver 100.

Processor 210 also may analyze the data from sensors 111 to determine an efficiency or quality of a shaving stroke, or of a shaving technique of the user. For example, processor 210 may analyze audio signals from sensors 111 to determine whether the user shaving stroke is too long or too short, and/or whether the tempo of the stroke is appropriate. Thus, processor 210 may determine whether the user is incorporating undesirable pauses in his or her shaving stroke, and/or whether the shaving stroke is too quick or too slow by analyzing audio signals from sensors 111.

Various mechanisms may be used to notify a user of sub-optimal shaving techniques and/or that shaver 100 is approaching an end of its recommended useful life. For example, a user may open an application on a computer or smartphone prior to commencement of shaving. As the user shaves, information about the shaving session may be generated and analyzed, and the results of the analysis may be displayed to the user via the application. Charts, text, colors, lights, pictures, or other suitable visual aids may indicate the length, frequency, and spacing of the user shaving strokes, and also indicate other suitable feedback, including, for example, whether the user is using shaving strokes that are too fast, too slow and/or whether the tempo of the user shaving stroke can be improved. In some embodiments, the application may provide auditory or tactile feedback instead of, or in addition to, visual feedback. For example, a vibration or sound may indicate that the user is using poor technique, or that one or more parts of shaver 100 should be replaced.

In some embodiments, lights, noises, vibrations, and/or other visual, tactile, or auditory feedback may be provided on a separate base. For example, a light may go on when one or more parts of shaver 100 should be replaced, or a light may turn from green to red to indicate the same feedback. Or a screen on the base may show similar visual indicators as those described above in reference to the application, or a vibration or sound may be generated by the base as described above.

In some embodiments, the feedback described above may be incorporated into shaver 100. For example, shaver 100 may vibrate or emit a sound when, for example, shaver 100 is determined to be near an end of its useful life. In other examples, different colored LEDs can be used to convey such information. For example, a green LED may indicate that the shaver has between, e.g., 50 to 100 percent of its useful life remaining, a yellow LED may indicate that the shaver has between, e.g., 25 to 50 percent of its useful life remaining, and a red LED may indicate that the shaver has less than, e.g., 25 percent of its useful life remaining. It should be appreciated that other color schemes and percentages also may be used in various embodiments.

In this way, shaver 100 may provide a user with real-time feedback regarding shaving technique and the useful life remaining of shaver 100 or of a cartridge 200. This guidance and feedback may help to guide a shaving session to improve the user shaving experience and to replace spent shaving equipment.

As indicated above, processor 210 may automate replacement ordering by contacting a merchant or may provide a prompt to the user via display on a base or mobile phone associated with shaver 100 within a certain period of time. For example, as processor 210 determines that shaver 100 or cartridge 200 is approaching the end of its recommended useful life, processor 210 may place or prompt an order for a replacement shaver and/or replacement cartridge. The replacement or prompting may also be based on accumulated user information, such as, for example, how often the user shaves and how many strokes the user uses during a given shaving session. This user information may help processor 210 estimate when shaver 100 or cartridge 200 will reach the end of its recommended useful life, and thus order replacement parts so that they will arrive before shaver 100 or cartridge 200 reaches the end of its recommended useful life. The base or mobile application may display or otherwise convey the accumulated user information.

The data collected by the various sensors described herein may be transmitted to a manufacturer of shavers 100 to be used for further study and analysis. In some embodiments, the user may need to grant the manufacturer permission to collect this data.

Processor 210 also may recommend one or more alternative shaving products based on the analysis of audio signals from sensors 111. For example, processor 210 may recommend that the user use a shaver with a different number of blades based on the length of the user shaving strokes (e.g., switching from a 3-blade cartridge to a 5-blade cartridge, or vice versa). Processor 210 also may suggest different products based upon the type of hair or beard identified. For example, processor 210 may recommend products suitable for high-density beards, low-density (sparse) beards, thick hair, thin hair, long hair, short hair, or any other quality (e.g., skin type) determined based on an analysis of audio signals gathered during shaving. Processor 210 may suggest different designs, including, e.g., different models, handles, cartridges, blades, coatings, shaving agents, or the like based on the analysis.

Figure 2:
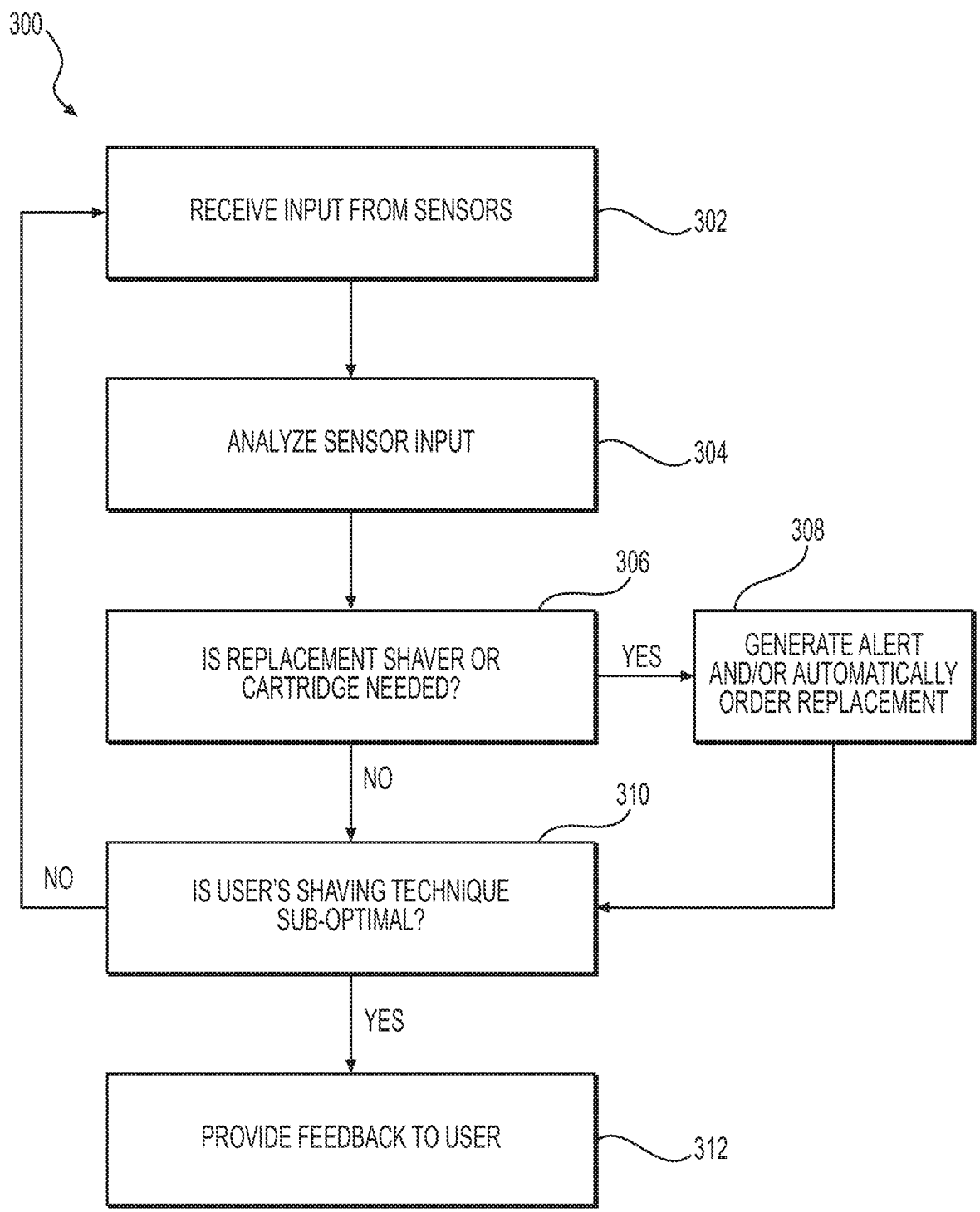
FIG. 2 is a flow diagram of an exemplary method according to the disclosure.

An exemplary method 300 is shown in FIG. 2. One or more steps of method 300 may be performed out of order or eliminated altogether. Method 300 may begin at step 302, where processor 210 may receive input from sensors 111 while the user is shaving. Method 300 then may proceed to step 304, where processor 210 may analyze the data from sensors 111. Based on the analyzed data, processor 210 may proceed to step 306 and determine whether a shaver 100 or cartridge 200 containing the sensors 111 is in need of replacement based on, e.g., a calculated distance travelled of shaver 100 or a number of shaving strokes taken by shaver 100 relative to a predetermined travel distance or shave strokes, respectively. If processor 210 determines that a replacement should be made, method 300 may proceed to step 308 where an alert may be generated and transmitted to the user, or where processor 210 may automatically initiate ordering of replacement parts. Method 300 may proceed to step 310 from step 308. Method 300 also may proceed to step 310 from step 306 if processor 210 determines at step 306 that replacement parts are not needed. At step 310, processor 210 may determine whether the user shaving technique is sub-optimal. If not, the method may return to step 302. If, however, there are one or more issues identified with the user shaving technique, method 300 may proceed to step 312, where the user can be informed of such issues via the various feedback mechanisms disclosed herein.

While principles of the present disclosure are described herein with reference to illustrative examples for particular applications, it should be understood that the disclosure is not limited thereto. Those having ordinary skill in the art and access to the teachings provided herein will recognize additional modifications, applications, embodiments, and substitution of equivalents all fall within the scope of the features described herein. Accordingly, the claimed features are not to be considered as limited by the foregoing description.

The invention claimed is:

1. A shaving system, comprising:
a handle;
a skin-contacting surface coupled to the handle;
one or more blades coupled to the skin-contacting surface;
one or more sensors configured to record sounds generated during use of the shaving system; and
a processor coupled to the one or more sensors, the processor is configured to utilize the recorded sounds to determine a number of shaving strokes taken with the one or more blades and to generate an alert or automatically place an order for new shaving components when the determined number of shaving strokes exceeds a predetermined threshold,
wherein the processor is configured to receive input from a user regarding characteristics of hairs of the user, and is configured to calibrate analysis of the recorded sounds based on the input regarding characteristics of the hairs of the user.

2. The shaving system of claim 1, wherein the processor is disposed in the handle.

3. The shaving system of claim 1, wherein the processor is disposed remotely from the one or more sensors.

4. The shaving system of claim 1, wherein the processor is configured to analyze a shaving technique of the user based on the recorded sounds.

5. The shaving system of claim 4, wherein the processor is configured to generate an alert based on a length of a shaving stroke of the user, a frequency of shaving strokes of the user, or a tempo of shaving strokes of the user.

6. The shaving system of claim 1, wherein the processor is configured to determine one or more of beard density and hair type based on the recorded sounds.

7. The shaving system of claim 1, further including a cartridge coupled to the handle, the cartridge including the skin-contacting surface, the one or more blades, and at least one of the one or more sensors.

8. The shaving system of claim 7, wherein the processor is configured to receive input regarding a type or model number assigned to the cartridge, and is configured to calibrate analysis of the recorded sounds based on the input regarding the type or model number assigned to the cartridge.

9. The shaving system of claim 8, wherein the processor is configured to receive the input regarding the type or model number assigned to the cartridge via an RFID tag or alphanumeric code coupled to the cartridge.

10. The shaving system of claim 1, wherein the processor is configured to determine whether shaving is complete based on the recorded sounds.

11. The shaving system of claim 10, wherein the processor is configured to determine whether shaving is complete by determining when a number of the recorded sounds in a given time period attributable to cutting hair is less than a threshold number.

12. A shaving system, comprising:
a handle;
a skin-contacting surface coupled to the handle;
one or more blades coupled to the skin-contacting surface;
one or more sensors configured to record sounds generated during use of the shaving system;
a processor coupled to the one or more sensors, the processor is configured to utilize the recorded sounds to determine a number of shaving strokes taken with the one or more blades and to generate an alert or automatically place an order for new shaving components when the determined number of shaving strokes exceeds a predetermined threshold; and
a cartridge coupled to the handle, the cartridge including the skin-contacting surface, the one or more blades, and at least one of the one or more sensors,
wherein the processor is configured to receive input regarding a type or model number assigned to the cartridge, and is configured to calibrate analysis of the recorded sounds based on the input regarding the type or model number assigned to the cartridge.

13. The shaving system of claim 12, wherein the processor is configured to receive the input regarding the type or model number assigned to the cartridge via an RFID tag or alphanumeric code coupled to the cartridge.

14. The shaving system of claim 12, wherein the processor is configured to determine whether shaving is complete based on the recorded sounds.

15. The shaving system of claim 14, wherein the processor is configured to determine whether shaving is complete by determining whether a number of the recorded sounds in a given time period attributable to cutting hair is less than a threshold number.

16. A method of analyzing a shaving session, the method comprising:
    receiving audio signals from one or more microphones coupled to a shaver;
    analyzing the audio signals;
    receiving input from a user regarding characteristics of hairs of the user, and calibrating analysis of the audio signals based on the input regarding characteristics of the hairs of the user;
    determining whether shaving is complete when audio signals associated with a number of strokes received in a predetermined time period exceeds a predetermined threshold; and
    providing feedback based on analysis of the analyzed audio signals.

17. The method of claim 16, wherein providing feedback includes:
    determining whether any replacement parts are needed based on the analysis; and
    generating an alert or automatically ordering replacement parts upon determining that replacement parts are needed.

18. The method of claim 16, wherein providing feedback includes:
    determining a shaving technique of a user; and
    providing feedback to the user upon determining the user shaving technique.

19. The method of claim 18, wherein determining the user shaving technique includes determining a length of a shaving stroke of the user, a frequency of shaving strokes of the user, or a tempo of shaving strokes of the user.

20. The method of claim 16, further including determining one or more of beard density or hair type based on the audio signals.

* * * * *